United States Patent
Brooks et al.

[11] Patent Number: 5,302,954
[45] Date of Patent: Apr. 12, 1994

[54] IDENTIFICATION APPARATUS AND METHODS

[75] Inventors: David R. Brooks; Graham A. M. Murdoch, both of Perth, Australia

[73] Assignee: Magellan Corporation (Australia) Pty. Ltd., Perth, Australia

[21] Appl. No.: 978,033

[22] Filed: Nov. 18, 1992

Related U.S. Application Data

[63] Continuation of Ser. No. 449,296, May 17, 1990, abandoned.

[30] Foreign Application Priority Data

Dec. 4, 1987 [AU] Australia ................ P15744

[51] Int. Cl.$^5$ .................................. G01S 13/80
[52] U.S. Cl. ............................ 342/44; 342/51
[58] Field of Search ................. 342/42, 44, 51

[56]  References Cited

U.S. PATENT DOCUMENTS

| | | | |
|---|---|---|---|
| 3,611,379 | 10/1971 | Deckett | 342/125 |
| 3,689,885 | 9/1972 | Kaplan et al. | 342/42 X |
| 3,701,150 | 10/1972 | Dame | 342/42 |
| 3,737,911 | 6/1973 | Sakuragi et al. | 342/44 X |
| 3,750,168 | 7/1973 | Schrader et al. | 342/30 |
| 3,878,528 | 4/1975 | Majeau | 342/44 |
| 3,886,548 | 5/1975 | Majeau et al. | 342/44 |
| 3,887,916 | 6/1975 | Goyer | 342/30 |
| 3,911,434 | 10/1975 | Cook | 342/50 |
| 3,945,006 | 3/1976 | Cleeton | 342/45 |
| 3,964,024 | 6/1976 | Hutton et al. | 342/44 X |
| 4,006,477 | 2/1977 | Yost, Jr. et al. | 342/51 |
| 4,023,167 | 5/1977 | Wahlstrom | 342/42 |
| 4,034,371 | 7/1977 | Maier | 342/43 |
| 4,095,226 | 6/1978 | Kratzer | 342/393 |
| 4,114,151 | 9/1978 | Denne et al. | 342/44 |
| 4,144,534 | 3/1979 | Prickett et al. | 342/43 |
| 4,206,462 | 6/1980 | Rabow et al. | 342/60 |
| 4,209,783 | 6/1980 | Ohyama et al. | 340/825 |
| 4,297,700 | 10/1981 | Nard et al. | 342/125 |
| 4,350,982 | 9/1982 | Alpers | 342/42 |
| 4,364,043 | 12/1982 | Cole et al. | 342/44 X |
| 4,388,524 | 6/1983 | Walton | 342/44 X |
| 4,510,495 | 4/1985 | Sigrimis et al. | 342/44 X |
| 4,551,712 | 11/1985 | Fockens | 342/42 X |
| 4,554,668 | 11/1985 | Deman et al. | 375/1 |
| 4,558,453 | 12/1985 | Mimken | 375/1 |
| 4,606,041 | 8/1986 | Kadin | 375/1 |
| 4,612,652 | 9/1986 | Kadin | 375/1 |
| 4,694,466 | 9/1987 | Kadin | 375/1 |
| 4,725,841 | 2/1988 | Nysen et al. | 342/44 |
| 4,786,903 | 11/1988 | Grindahl et al. | 340/825.54 |
| 4,829,540 | 5/1989 | Waggener, Sr. et al. | 375/1 |
| 4,850,036 | 7/1989 | Smith | 455/179 |
| 4,862,176 | 8/1989 | Voles | 342/45 |
| 4,931,788 | 6/1990 | Creswick | 340/825.54 |
| 4,963,887 | 10/1990 | Kawashima et al. | 342/44 |
| 5,029,182 | 7/1991 | Cai et al. | 375/1 |
| 5,043,903 | 8/1991 | Constant | 364/460 |
| 5,051,741 | 9/1991 | Wesby | 340/825.49 |

FOREIGN PATENT DOCUMENTS 34109 10/1984 Australia .
70062 3/1987 Australia .

Primary Examiner—John B. Sotomayor
Attorney, Agent, or Firm—Baker & Daniels

[57]  ABSTRACT

An identification system comprising a transponder having receiver means adapted to extract powering energy from a surrounding electromagnet field, transponder transmitter means adapted to transmit at least one unique signal from the transponder, frequency generating means for generating a plurality of pre-determined frequencies, each frequency adapted to carry the signal from the transmitter means to an interrogator receiver means adapted to receive said signals to achieve identification of said transponder, said transponder transmitting signals successively or repetitively using at each successive or repetitive transmission a newly selected frequency or set of newly selected frequencies.

39 Claims, 11 Drawing Sheets

SINGLE OSCILLATOR WITH SETTING OF CARRIER FREQUENCY PERFORMED BY CHOOSING 'n'

INDIVIDUAL PRESET OSCILLATORS, CARRIER FREQUENCY SELECTED BY CHOOSING OUTPUT FROM (AT LEAST) ONE OSCILLATOR

FREQUENCY/PHASE MODULATION DETECTOR

ENVELOPE DETECTOR

IDENTIFICATION APPARATUS AND METHODS

This is a continuation of application Ser. No. 07/499,296, filed May 17, 1990, now abandoned.

FIELD OF INVENTION

The present invention relates to a system of multiple device identification. The present invention further relates to a system utilising a plurality of remote devices and/or passive labels, the passive labels being adapted to extract energy from an applied magnetic field, the energy enabling transmission by the label of a signal, unique or coded, to be identified by a receiver, the remote devices being powered so as to transmit said signal, unique or coded. Each label or device can transmit simultaneously. Transmitting and receiving apparatus and methods of the system are also herein contemplated. The present invention in a preferred form is suitable for transponder (or a plurality thereof) identification.

PRIOR ART

Conventional passive identification or transponder systems known to Applicant utilise a system in which a single common carrier frequency is used to transmit data or identification codes from and/or to each transponder. Simultaneous transmission by more than one transponder results in co-interference between the signals so transmitted and prevent correct identification of any of the transmitting transponders i.e. simultaneous transmission gives rise to corrupted signal(s).

Furthermore, the Applicant is aware of AU-A-70052/87 which describes a radio meter reading system that is designed to correctly read signals from several transponders simultaneously. The system utilises a "wake-up" signal from the interrogation station to activate a battery powered transmitter in each transponder. Data containing amongst other things the transponders ID and the meter reading modulates a transmitted carrier signal. The frequency of the transmitted carrier signal is randomly varied using a frequency control voltage derived from a digital pseudo-random generator. The transmitter is designed to keep these carrier frequencies within an allowed band.

The system disclosed is not capable of precisely controlling the carrier frequencies. Consequently, direct coherent detection of the transponder signals is not possible. Powering of the receiving circuitry for detecting the "wake-up" signal requires a battery or other external source of electrical power. Beyond the "wake-up" signal, there is no communication from the interrogator to the transponders.

Australian Patent AU-A-34109/84 discloses a transponder that transmits two or more carrier frequencies modulated with identical data. The carrier frequencies are either harmonics or sub-harmonics of the interrogation powering frequency. The specification is directed to the determination of correct data that has been transmitted when there is coincidence between the data on at least two of the carrier channels. With sufficient harmonic and sub-harmonic channels, external interference is unlikely to eliminate all of the transmitting channels.

This specification does not disclose a device capable of correctly interrogating more than one transponder simultaneously.

All transponders are constrained to transmit identical harmonic and sub-harmonic frequencies and will consequently interfere on all channels if and when two or more transponders are active. The harmonics are generated by a square wave derived from the interrogation signal. Square waves are rich in odd harmonics. There is no possibility of selecting any particular harmonic(s) for transmission, as all harmonics are generated and radiated by square waves.

OBJECT OF THE INVENTION

An object of the present invention is to provide a system wherein a plurality of devices may be simultaneously identified and/or a single device may also be identified.

A further object of the present invention is to provide a system which may be specifically designed to identify devices within an acceptable failure rate criterion.

A further object of the present invention is to provide a system having minimal co-interference and wherein a plurality of devices may be correctly identified by a single receiver even if the devices are in close proximity.

A further object of the present invention is to provide a multiple transponder identification system, each transponder therein being implemented in a single (IC) chip form.

Another object of the present invention is to provide a system adapted to identify many objects such as personnel, livestock, baggage, packages, cargo, stolen goods, vehicles, trains, wagons, shipping containers, security cards and may be used in environments requiring identifying or interrogating capabilities, such as inventory control and computer security.

Another object of the present invention is to provide a system wherein any one or all device(s) and/or transponder(s) therein can be interrogated or altered in response to a radiated magnetic field.

Another object of the present invention is to provide a system comprising disposable and cheap transponders or labels.

SUMMARY OF INVENTION

The present invention provides a system of device identification comprising:

at least two spaced identifiable device and a device identifier wherein:

each identifiable device comprises means forming transmitter means, means forming a device identification code and modulation means, said modulation means and code means being adapted to drive said transmitter means so that said device identification code is transmitted and identified by said device identifier.

The present invention provides a system of multiple transponder identification comprising:

at least two transponders, a magnetic power field generator/radiator and a transponder identification code receiver, wherein each transponder comprises receiver/transmitter means including an inductive means adapted to simultaneously receive power to operate the transponder and transmit coded modulated signal(s), memory means for storing an identification code, modulation means and control means, said receiver/transmitter means and memory means being adapted to jointly co-operate with said modulation means, when each transponder is under the influence of said power field to transmit an identification code unique to each transponder to said code receiver, the control means being adapted to co-ordinate operation of said memory, modulation and receiver/transmitter means, and wherein the code receiver receives each unique code and identifies each respective transponder.

The present invention in another aspect provides a transponder comprising:

transponder receiver means adapted to extract powering energy from a surrounding electromagnetic field, transponder transmitter means adapted to transmit at least one unique signal from the transponder, frequency generating means for generating a plurality of predetermined frequencies, each frequency adapted to carry the signal from the transmitter means to an interrogator receiver means adapted to receive said signals to achieve identification of said transponder.

The present invention provides an identification system comprising:

a transponder having means to extract powering energy from a surrounding electromagnetic field, and a transmitter means adapted to transmit one or more unique signals, and receiver means adapted to receive said signals and identify said transponder.

The present invention also provides an identification system incorporating a transponder as described above.

The present invention also provides an identification system comprising:

a plurality of transponders, each transponder having means to extract energy from a surrounding electromagnetic field and transmitter means adapted to transmit at least one unique signal at at least one frequency selected from a plurality of predetermined frequencies, and receiver means adapted to receive each of said unique signals and identify said transponder.

The present invention further provides a system for simultaneously identifying a first and second label, each label comprising code storage means, modulation means and an inductive receiver/transmitter means, the system comprising:

magnetic field generator/radiator means for generating a magnetic field from which said first and second labels are adapted to extract power using said inductive means, each of said first and second labels, when so powered, respectively providing at least one unique code from the code storage means to the modulation means, said modulation means being adapted to provide at least one modulated code to the inductive means for transmission to a label identifying receiver, each label adapted to modulate said at least one code onto at least one carrier frequency randomly selected from a predetermined finite set of modulation frequencies, each label being further adapted to re-transmit its said at least one code at another or the same at least one frequency randomly selected from said set of frequencies while each label remains powered, each label being embodied in a single (IC) chip.

The present invention also provides an identification system comprising:

a transponder adapted to transmit at least one data signal at at least one carrier frequency selected from a plurality of carrier frequencies, said transponder including control means for selecting said at least one selected frequency and, when the data has been transmitted, for re-selecting the or another at least one selected carrier frequency from the plurality of carrier frequencies in accordance with a predetermined probability weighting, the transponder being adapted to continue transmitting the data at the or another at least one selected frequency while the transponder is powered, and receiver means adapted to receive the or said another at least one frequency including is demodulator means for obtaining the data.

The present invention further provides an identification system comprising:

a first and a second transponder, said transponders being adapted to continuously transmit respective first and second data signals while each transponder is powered, the first and second data signals having a first and a second respective carrier frequency selected from respective first and second predetermined sets of possible carrier frequencies, said first and second transponders including respective first and second selector means for selecting the first and the second respective carrier frequency from said respective sets of frequencies, receiver means for receiving the first and second data signals simultaneously, demodulator means for demodulating the first and second data signals at their respective carrier frequency to obtain a first and second respective transponder identifying code.

The system may further comprise comparison means adapted to disregard corrupted transponder or label codes or signals.

The signal(s) may be at a radio frequency or at any other frequency.

The random selection of carrier or modulation frequency(s) provides improved resistance to interference between labels. Co-interference of labels may be statistically ignored by the identifying receiver.

Each transponder may continue to transmit its transponder identification code while under the influence of the generator or while being powered.

Each transponder may include at least one transmission break during which its transponder identification code is not transmitted.

The transponder identification code receiver may comprise demodulation means adapted to identify each is transponder.

The present invention provides for the use of a passive coil label to extract energy from a surrounding applied field and the re-transmission by the passive label of a unique signal to be picked up by a receiver.

Reference herein to transponder(s) or label(s) should be read so as to include any other suitable device.

The present invention will now be described with reference to the accompanying drawings, wherein:

DETAILED DESCRIPTION OF THE INVENTION

The or each, transponder may be embodied in a single (IC) chip form. An external capacitor may be used to store the chip operating voltage. The receiver/transmitter inductive means, preferably a single coil, may also be mounted externally to the chip.

Figure 1:
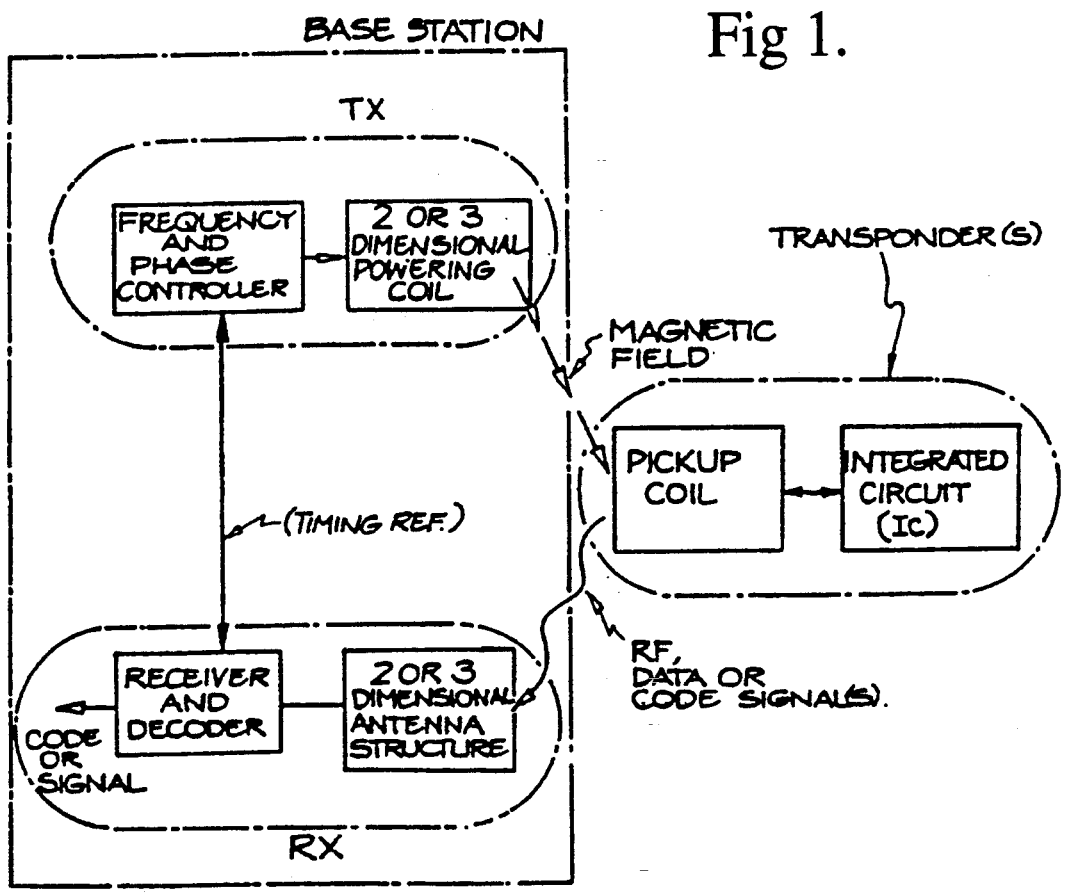
FIGS. 1A and 1B show an identification system in accordance with the present invention.
Figure 1B:
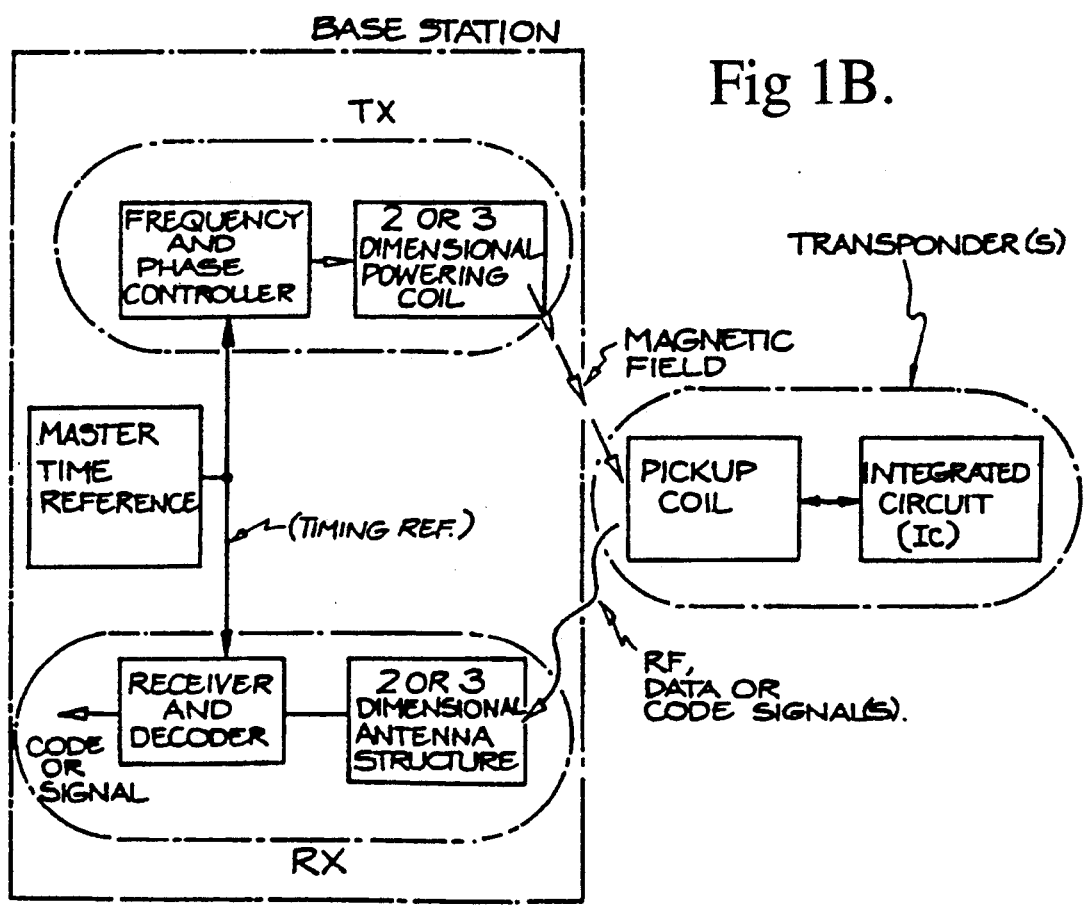
Figure 2A:
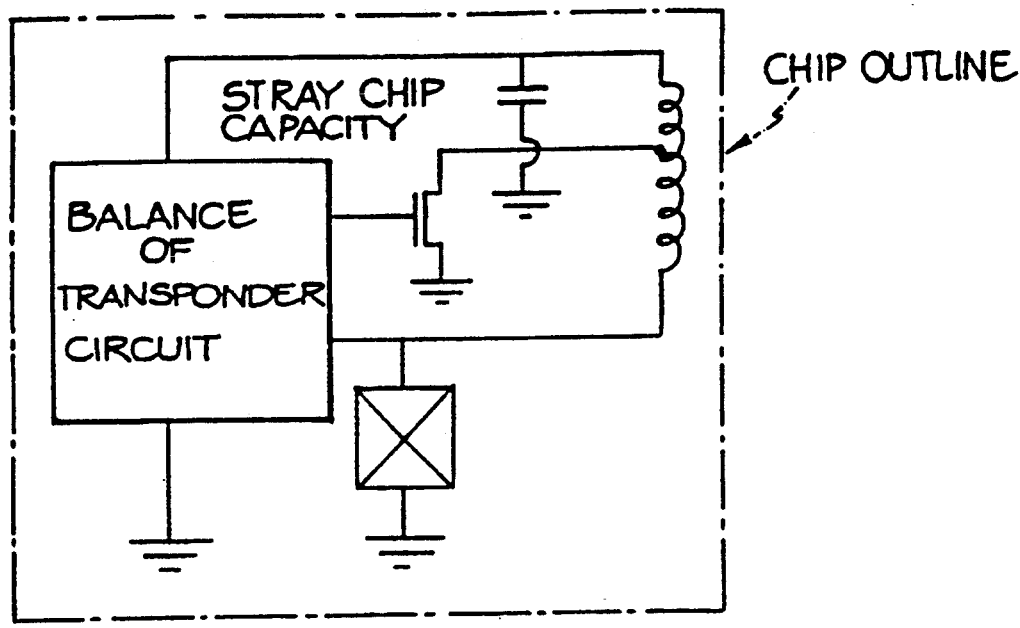
FIGS. 2A, 2B, 3A, 3B and 4A, 4B show embodiments of a transponder suitable for use in the present invention.
Figure 2B:
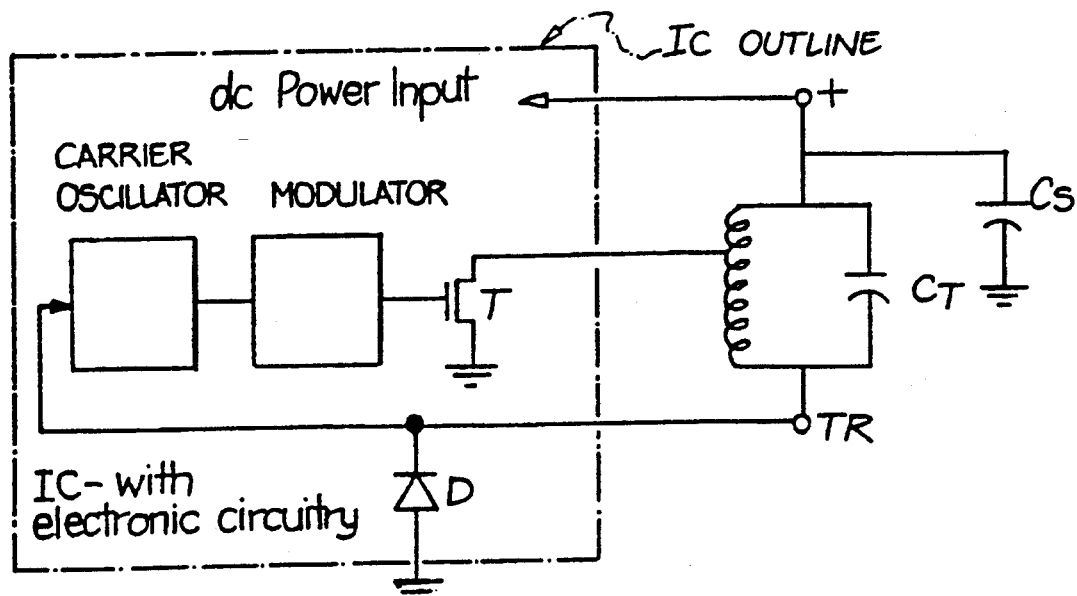
Figure 3B:
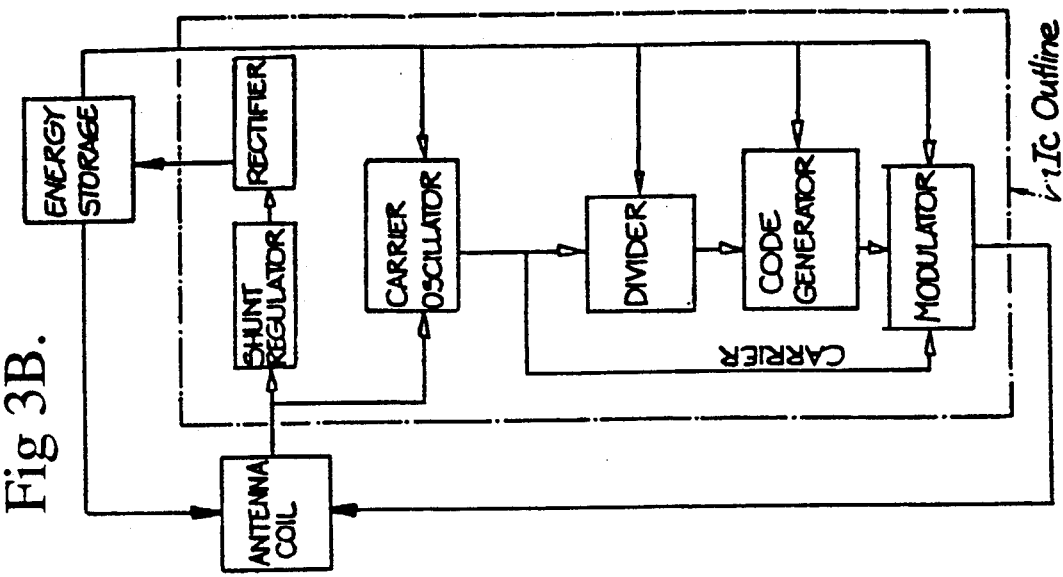
Figure 3A:
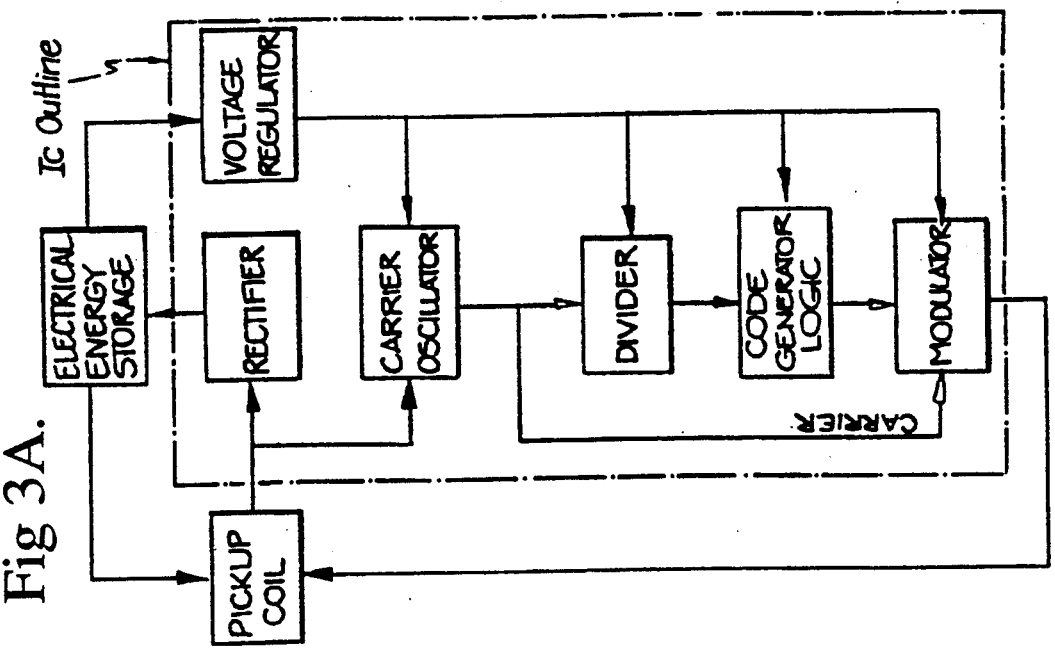
Figure 4A:
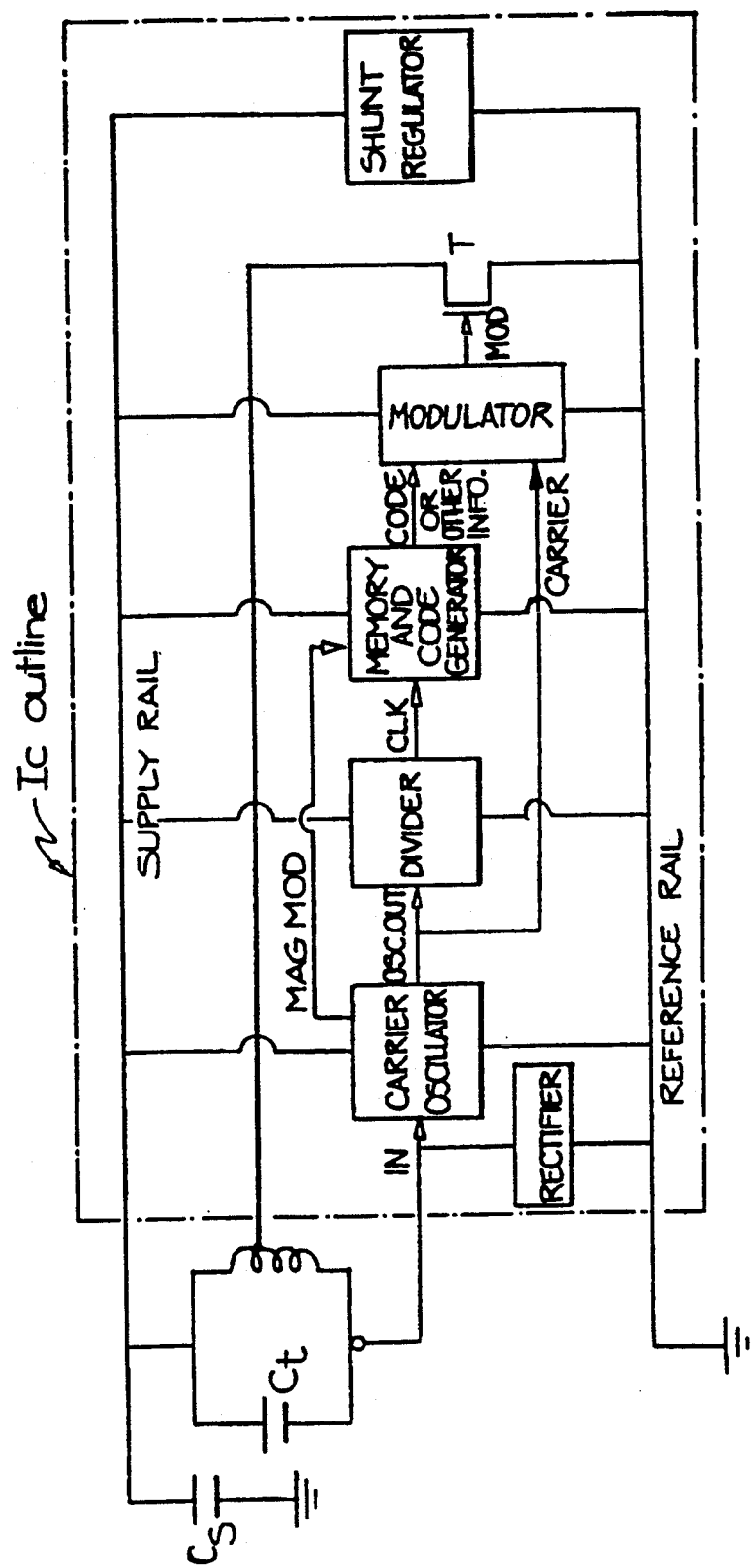
Figure 4B:
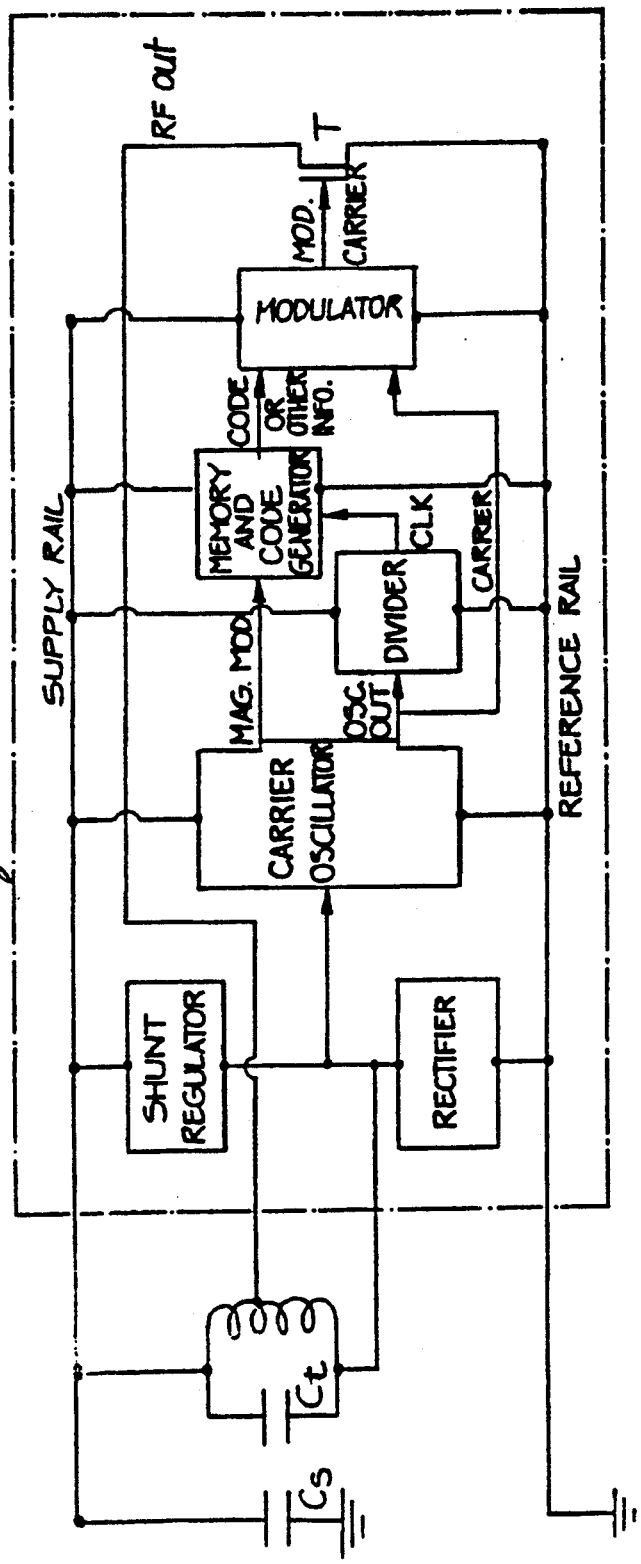

With reference to FIGS. 1A and 1B, the base station may include a transmitter for generating an ultrasonically oscillating magnetic field. The transponder(s) may contain a tuned pickup coil which may extract power and/or timing and/or other information from the magnetic field. The frequency, magnitude and phase of the magnetic field generated by the base station may be carefully controlled to enable the power picked up by the transponder coil to be adequate for most transponder orientations. A magnetic field radiated in two or three dimensions will aid power and information reception by the transponder(s). Identification codes and/or specially stored or other information may be transmitted from the transponder to a receiver in the base station, conventionally, by an RF or other suitable signal. Programming and/or interrogation of temporary or permanent memory on one or more transponder(s) may be performed conventionally, for example by modulation of the powering field. Concatonated coil(s) may be used to maintain field intensity in a predetermined space through which the transponder(s) will move. Magnetic field concentrator(s) may be used to amplify field intensity.

Furthermore, the transponder(s) may generate one or more carrier frequencies from an available set of carrier frequencies. These carrier frequencies are preferred not to be harmonically related to the frequency of the powering magnetic field. By allowing each transponder to use any one of a multiplicity of available carrier frequencies, many transponders simultaneously transmitting to the base station may be identified under conditions where co-interference would normally preclude correct identification. Ensuring correct identification may be enhanced by reducing the possibility of more than one transponder simultaneously transmitting at the same frequency. An idle state, during which a transponder does not transmit, may aid correct identification. The number of carrier frequencies and idle states may be contingent upon the particular application. The correct identification of a transponder may be reliant upon the transponders having a carrier frequency or mix of carrier frequencies, free of interference by other transponders, to transmit on. The particular mix of carrier frequencies, idle states and probability weightings may be chosen to maximise the probability of any one transponder having a free channel to transmit, to a receiver, its identification code word. Inclusion of redundant frequency channels may guard against the possibility of chance transponder interference. Signals which may have been corrupted or co-interfered with may be ignored by the receiver, and may thereby enable the system to operate within a predetermined failure rate criterion. Corrupted or co-interfered signals may be determined on a statistical basis or by means of an error detecting code. The transponder(s) may transmit the identifying code at a randomly selected frequency(s), selected from a set of available carrier frequencies, and, once transmission is completed, again re-transmit the code at the same or another frequency(s) selected from the carrier frequency set. The identifying code may be used to modulate the selected frequency(s).

The system of transponder identification according to the present invention may allow for identification of a number of objects by a uniquely coded transmission from a passive transponder or label attached to each object, identification occurring at substantially the same time.

With reference to FIGS. 2A, 2B, 3A, 3B, 4A and 4B, power, preferably in the form of a magnetic field, may be transmitted inductively or radiated to the transponder. Each transponder may include one or more pickup or receiver transmitter coils or inductive means. To minimise detailing, further reference herein is made to only single coiled transponder(s). A pickup coil, preferably tuned, may be situated in the transponder to collect or receive the power. After rectification, the power may be utilised by an integrated circuit (IC) within the transponder. The frequency of the powering signal may be used as a universal frequency reference for both the IC and the base station (FIG. 1A). Alternatively, an oscillator in the base station may serve as a universal timing reference for the powering signal, base station receiver and transponder IC (FIG. 1B). The transponder IC derives its frequency reference from the powering signal (FIGS. 2A, 2B, 3A, 3B, 4A and 4B). Each transponder may be controlled and/or programmed by modulating the inductive powering field. This modulation may enable data or commands to be transmitted to one or more transponder(s). This modulation may be used, for example, to program data into the transponder, set bit(s) in the transponder which may control the transponder's function e.g. a bit to disable transmission permanently when the transponder is discarded, or control the transponder's activity while it is being inductively interrogated e.g. forcing a change in the transponder's carrier frequency, or generally controlling and/or interrogating other transponder units or functions.

To ensure that the transmission of power and/or signal(s) is as uniform as possible, a two, or if necessary, a three dimensional antenna system may be used. An antenna structure at the base station may receive the transponder's coded carrier transmission. With regard to the IC of a transponder, it may generate one or more non-harmonically related carrier signals from the frequency of the powering field. The method of generating these carrier signals will be explained further on.

The carrier signals generated by the IC are phase locked to the powering signal. The powering signal is derived from a master oscillator in the base station. Coherent locking of the carrier signals allows direct coherent demodulation of the coded carrier signal by the receiver and demodulator in the base station. Coherent detection is the optimum detection scheme for coded carrier signals. The frequency of the powering field or a carrier signal divided down may be utilised as a clocking signal for the IC. A unique code, preset, programmed or selected in the IC may be used to modulate the carrier signal at a rate determined by the clocking signal. The modulator may produce a modulated RF signal using, typically, phase modulation, amplitude, pulse width, pulse position or other modulation. This code modulated signal may be injected into the transponder pickup coil for inductive transmission to a receiving antenna structure.

Figure 9:
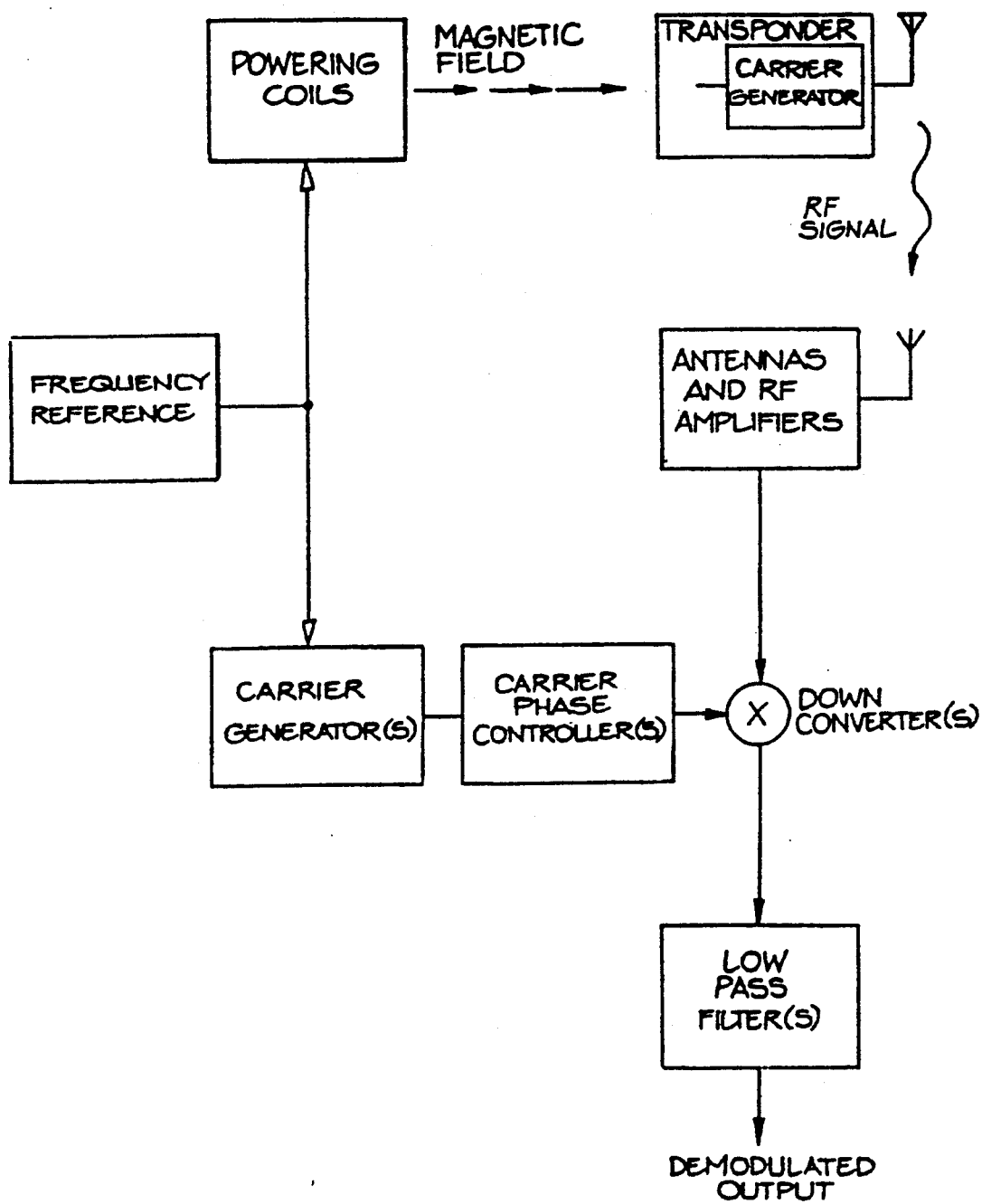
FIG. 9 shows a schematic of a coherent receiver.

The signal(s) received from one or more transponder(s) may be amplified and coherently detected, using a local oscillator locked on to the powering field's frequency or preferably the base stations master time reference oscillator. A multiplicity of coherent detection schemes may be used to detect the received signal(s), all of which are known to those skilled in the art of communication. For example, direct homodyne detection of a transponder carrier may be possible using a local oscillator locked to the transmitted powering field's frequency (FIG. 9). The power field's frequency may be used as a universal timing reference. For a preferred modulation scheme (phase modulation), optimum detection may be realised using correlators locked to the powering field's frequency. Either a frequency agile receiver or a multiplicity of receivers may be tuned to the different possible carrier frequencies contained within the set of carrier frequencies to receive the transmitted signal from the transponder(s).

For those applications where the orientation of the transponder may be random, such as baggage and livestock identification, special antenna structures may be necessary such that the voltage picked up by the transponder(s) coil, which may be dependent upon the cosine of the angle between the transponder coil axis and the direction of the magnetic field, is preferably substantially constant over a large volume of space, and so that rapidly moving transponders may be satisfactorily identified. Ideally, the power transferred to each transponder coil should be independent of transponder orientation.

To provide an isotropic powering field three sets of coils may be orientated along the X,Y and Z axes. The phase and frequency used to drive these coils may be carefully controlled to generate an isotropic powering field and provide a uniform field over a substantial volume of space. Two coils may alternatively be used.

The data transmitted from the transponder may be received by loop antennae set up in two or three dimensions or axes. The data signals from each axis may be detecting separately and may be combined for decoding or decoded separately.

Interference may be cancelled by mounting a set of "interference coils" in proximity of the transponder(s) data or signal receiving coils. The signal from the interference coil may be subtracted from the receiver signal cancelling any interference. Cancellation may be done at the carrier's frequency.

By having one or more transponder(s) select, preferably randomly, from a plurality of possible transmission frequencies, and/or by utilising one or more transmission break(s), during which no transmission from at least one transponder is made, or a combination of these, the simultaneous identification of a plurality of transponders may be possible. Each transponder in the system of the present invention, when powered, may begin to transmit its code or other information. This transmission may be continuous while the transponder is powered. The transmission may be based on a preferably randomly selected frequency(s), from a possible set of frequencies, or transmission breaks.

A method, of identification for use in a system as described hereinbefore, the system being adapted for any system designed to identify transponder(s) or labels, may include an acceptable failure rate criterion. The correct identification of each transponder may require that each transponder has at least one complete code or data word transmission free of interference from other transponder(s).

For a transponder to be correctly identified it only requires one good read during an interrogation cycle. Alternatively, for the transponder to not be identified requires that all reads are bad, i.e. P (at least one good read) = 1 − P (all reads are bad).

Probability that a read is good requires that no other transponder is using the same carrier frequency, if there are "m" transponders and "n" channels and each transponder's transmissions are independent of all other than this probability is:

$$\left(\frac{n-1}{n}\right)^{2(m-1)}$$

hence the probability that a transmission is bad is:

$$1 - \left(\frac{n-1}{n}\right)^{2(m-1)}$$

and the probability that of k code transmissions all are bad is $$\left(1 - \left(\frac{n-1}{n}\right)^{2(m-1)}\right)^k$$

This is the probability that a particular transponder will fail to be identified during an interrogation cycle.

By carefully choosing the number of carrier frequencies available to a transponder and/or the availability of a transmission break, the system's failure rate may be matched to the acceptable failure rate.

Figure 5:
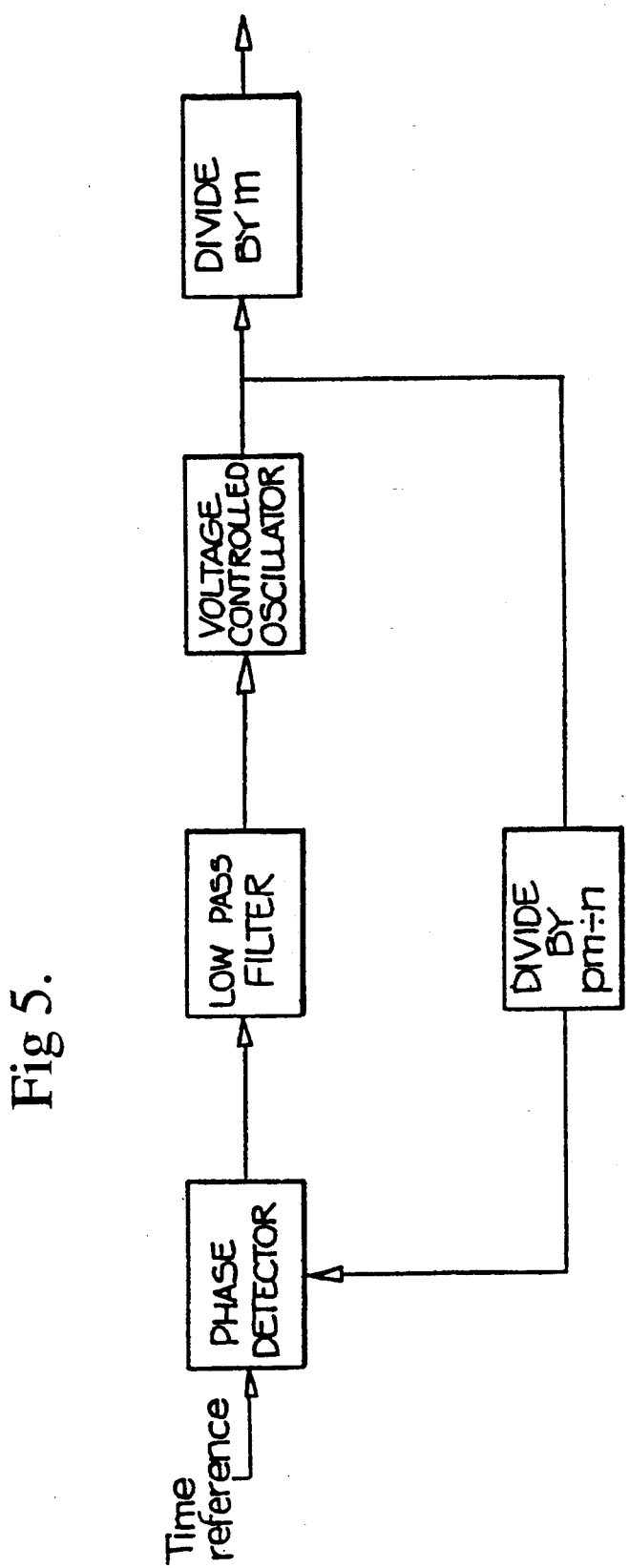
FIG. 5 shows a circuit for generating the transponder carrier signal.
Figure 6:
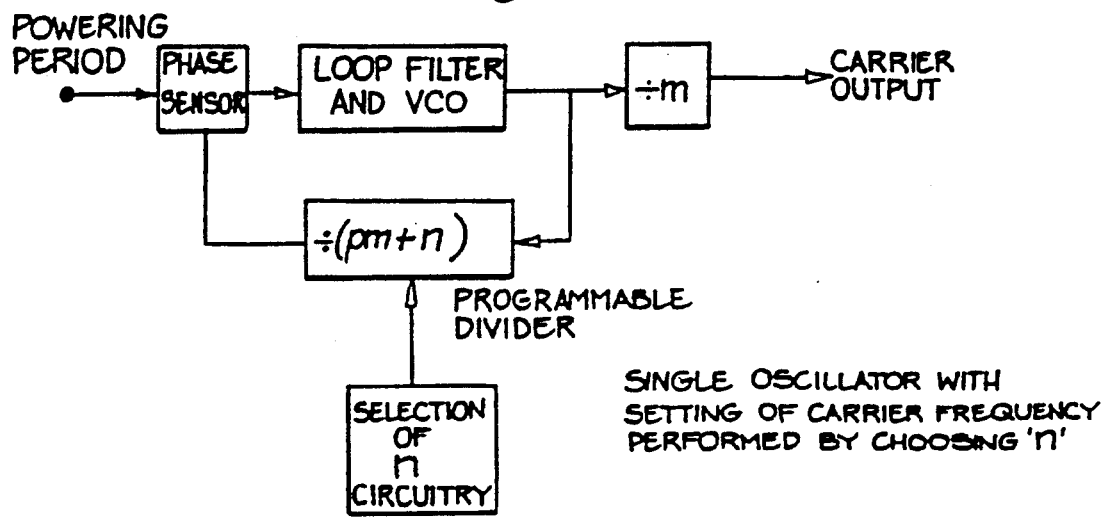
FIGS. 6 and 7 how alternative embodiments capable of generating a plurality of carrier frequencies.
Figure 7:
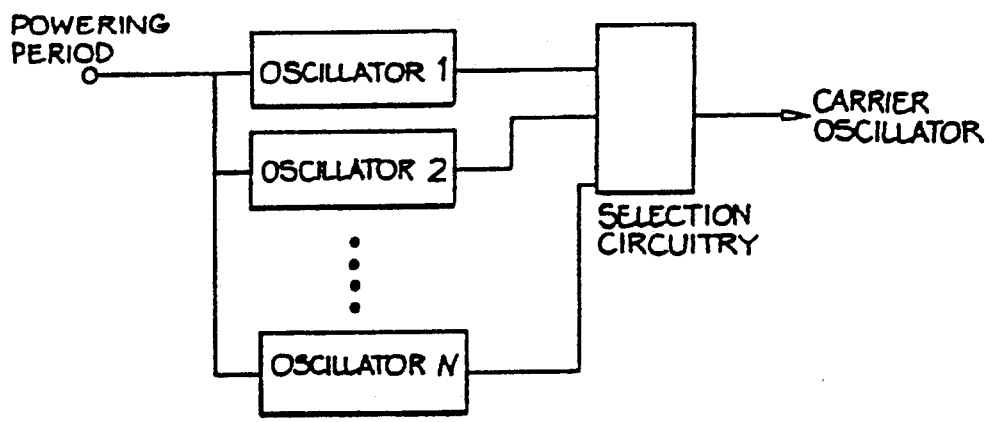
Figure 8A:
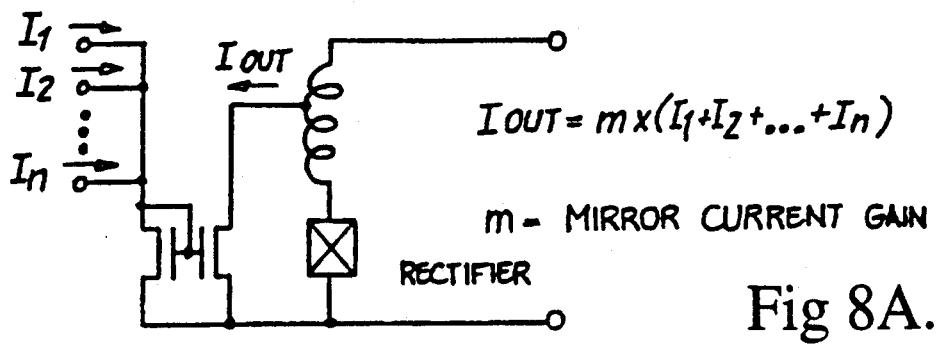
FIGS. 8A and 8B show two circuits for transmitting two or more modulated carrier signals simultaneously and independently of each other.
Figure 8B:
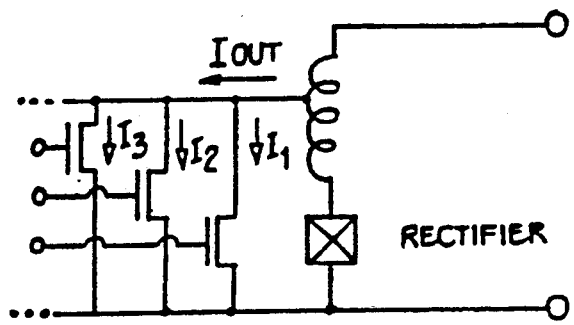
Figure 10A:
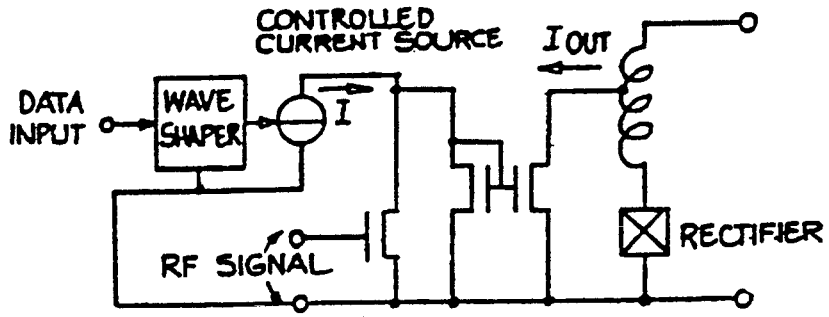
FIGS. 10A and 10B show two circuits for envelope shaping the modulated carrier signal to reduce sideband interference between channels.
Figure 10B:
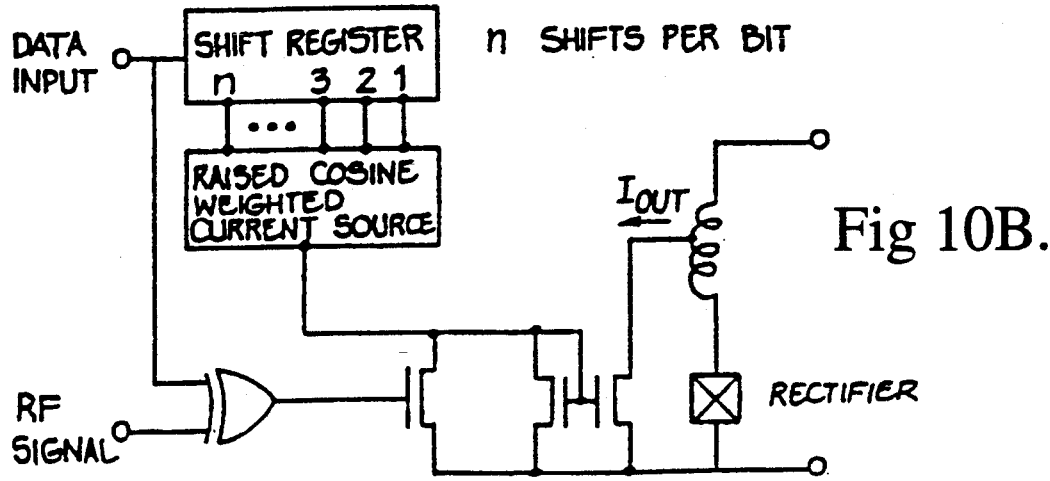

A carrier generator in each transponder or label may generate carrier frequency(s) for use by the modulation means. The carrier frequency(s) may be generated by one or more voltage controlled oscillators (VCO's) which may be phase locked to the frequency of the inductive powering field. The output carrier frequency may equal $(p+n/m)$ x (frequency of inductive power field); where p is a harmonic of the powering field's frequency and the ratio n/m is not an integer (FIGS. 5 and 6). A circuit for generating the carrier frequency is shown in FIG. 5. The circuit is a phase locked loop (PLL) incorporating a frequency divider in the feedback loop. This type of circuit is well known and acts as a frequency multiplier with the output frequency of the VCO (or other similar controlled oscillator) equal to the divider magnitude:

frequency $VCO = (pm+n)$ x frequency time reference.

The VCO output frequency will always be a harmonic of the powering field and potentially would be prone to interference from the field's harmonics. Dividing the VCO output by "m" changes the output frequency such that only every $m^{th}$ carrier frequency coincides with a power field harmonic. In the preferred embodiment these frequencies are not utilised by the transponder. Consequently, the powering field's harmonics may never interfere with the carrier transmissions.

A further advantage of this method of phase coherent carrier generation is that a similarly generated local oscillator signal at the base station can be used to coherently detect and demodulate the carrier signal(s). This oscillator can be phase locked to the powering field (like the transponder carrier oscillator) or in its preferred form to a master time reference oscillator from which the power field's frequency is derived. Direct homodyne detection of the carrier can be done using identical frequency generating parameters n, m and p as used by the transponder carrier oscillator. Alternatively the carrier signal can be converted to an intermediate frequency (IF) before detection. These coherent detection principles are widely utilised and well understood.

The present invention may provide a system in which control of the selection of a carrier frequency(s) and/or transmission break(s) may be accomplished. Varying degrees of complexity may be implemented by the selection circuitry. In one embodiment, a pulse of modulation, on the powering field, may cause any affected transponders to randomly select a carrier frequency or transmission break. By appropriate coding of this modulation of the powering field, coupled with suitable detection and decoding circuitry on each transponder, more elaborate selection schemes such as, turning off a particular transponder's transmission, forcing some or all transponders off a channel(s), or changing a particular transponder's channel may be implemented. Frequency, phase, amplitude or pulse modulation or any combination of these can be used to modulate the magnetic powering field.

For an arbitrarily modulated oscillating magnetic field, the data rate may be limited by the bandwidth of the transponder's antenna. This may be sufficiently large to allow a data rate of any required number of kilobits per second.

Figure 11:
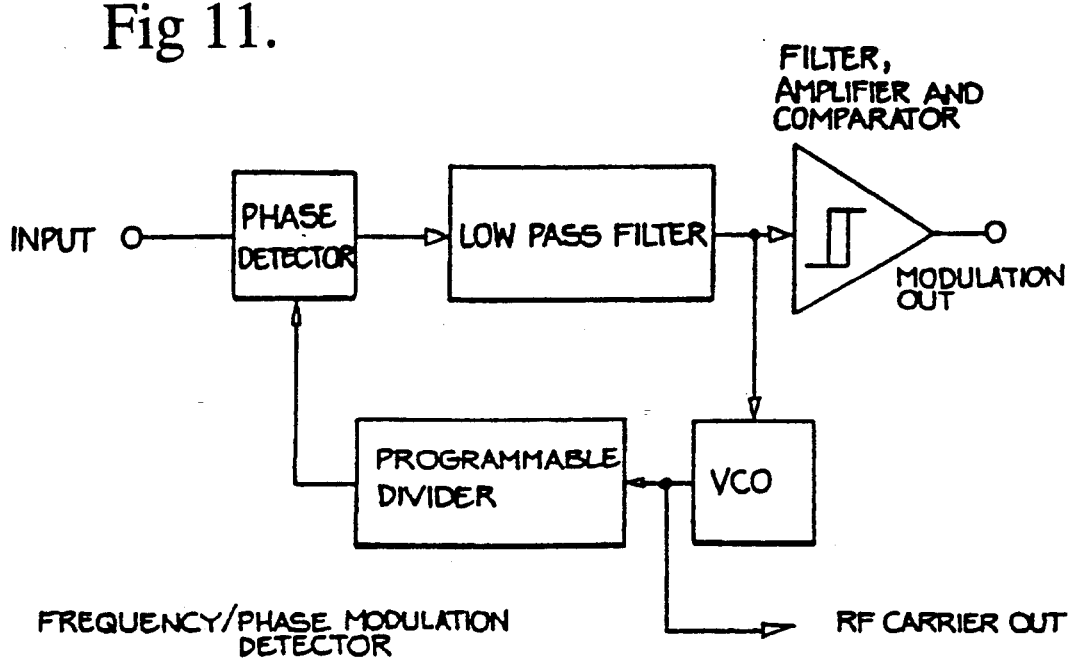
FIGS. 11 and 12 show modulation detection circuits.
Figure 12:
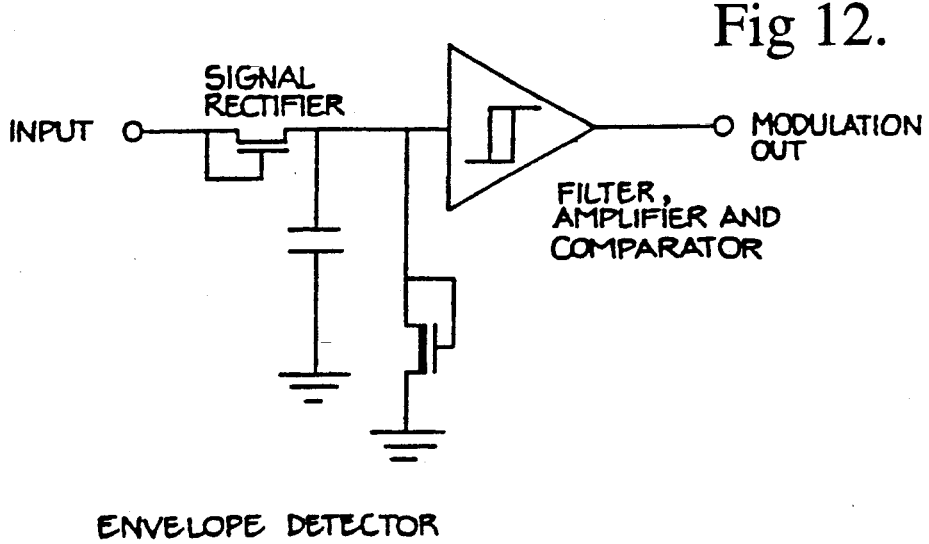

Preferably, the magnetic field may be phase or frequency modulated because these may not appreciably affect the power transmission from the transmitter to the receiving unit. Amplitude, pulse width or pulse position modulation may also be used. FIGS. 11 and 12 show circuits for detecting this modulation.

The simultaneous action of power transfer and data or command transmission by a magnetic field may allow the remote control of electro-mechanical devices and/or electronic circuits and the remote programming of E$^2$PROM or conventional CMOS memory with battery backup in a manner similar to that as detailed herein.

Arbitrary probability weightings of selection may also be assigned to each carrier frequency and/or idle state. Alternatively, a transponder may randomly select either a transmission break or carrier frequency. The carrier frequency of the transponder may be altered after each completed code or data word transmission or the transmission of more than one code or data word before reselecting the carrier frequency.

The system may also provide for the simultaneous transmission of more than one carrier frequency by any transponder. Transmission of more than one carrier can be used to increase the communication reliability or to increase the rate of data transmission. Different sets of data or unique signals can be transmitted on different carrier frequencies. A transponder may select a subset of carrier frequencies from the full set of available carrier frequencies. The exact number of carriers transmitted, the size of the full set of carrier frequencies and the method of selection i.e. whether controlled or by random internal selection, would depend upon the particular transponder's application.

It has been shown mathematically, that in a system of "m" labels, each randomly choosing one out of "n" distinct radio channels before each transmission, if a total of "k" transmissions are possible (by any one label) within the available time, the probability of one or more labels failing to be identified, is given by $$\left(1 - \left(\frac{n-1}{n}\right)^{2(m-1)}\right)^k$$

The use of certain, inherently random, natural processes (to generate the random numbers used here to select the transmitting channel), is well known. Examples used in practical equipments include radioactive decay processes, and the so-called "shot noise" generated by quantum mechanical processes within semiconductor diodes.

These processes are, however, somewhat awkward to implement on a semiconductor, VLSI, "chip". The noise-diode approach, in particular, suffers from the risk that the "noise" signal (which is at a low amplitude) will be contaminated by other, stronger electrical signals present on the chip. This could seriously impair the statistical properties of such a signal.

The use of a "Pseudo-Random Binary Sequence" (PRBS) generator, in digital systems, is well known. The device typically comprises a digital shift register (built using any known method), associated with a computing means (typically an arrangement of logical gate circuits), which generates a binary, logical function of the shift register's contents. This value is applied to the serial input of the shift register. As the shift register is clocked, a new binary number appears in the several "bits" of the register.

With a careful choice of register length, and of the mathematical function generated by the said computing means (the "feedback function"), it is possible to generate a sequence having as many as $2^N - 1$ distinct values (a so-called maximal-length, or "M—" sequence) using a N-bit shift register. Such a sequence can exhibit mathematical properties closely approximating a true, random sequence.

on the face of it, such a device is inherently unsuitable for the present purpose. The reason is that, when the label is first excited by the powering magnetic field, there is no means to determine what will be the initial contents of said shift register. In practice, the initial value will almost always be a constant value, identical for every label. (The value will be a function of the physical circuit layout on the VLSI chip. This, of course, is the same for every label).

In such a case, every label being initially started at the same number, the feedback function will reproduce identically in every label, and they will continually transmit on the same channel. This defeats the purpose of the system.

A simple modification permits the use of a PRBS generator (so gaining its acknowledged advantages of inherent suitability for VLSI implementation), but avoids the problem aforementioned.

Recall that the labels contain, inter alia, a "memory means" to record their identification codes. Let this memory means be expanded sufficiently to store, besides said identification code, a further number, having as many bits as has the PRBS shift register. Let the control circuitry in the label be so adapted that, whenever the label is first excited by the powering field (i.e. its logic circuitry "starts up"), this additional number is loaded into said PRBS register. This number being loaded, the PRBS generator operates as described.

Let further, the associated programming means (the equipment which initially stores the identification code in said memory means) be further adapted to store also, a randomly generated number (another PRBS circuit would suffice here) in the additional memory space aforementioned.

With a total of "N" binary bits in the PRBS register, we have now a 1 in $2^N-1$ chance that two labels will start up at the same point in their PRBS sequences. In that event, the system will fail, since these two will always "track" each other. With a target value for system reliability determined, this rule fixes a minimum length for the PRBS generator. Commonly, the PRBS register will be given a length equal to the next prime number, larger than the size found above.

The PRBS system is particularly effective, if both the number of bits, N, in the register, and the number of PRBS states, $2^N-1$, are both prime. In this case, however many times the register is shifted between channel selections, all possible states will be exhausted before the cycle repeats. An example of such a PRBS circuit comprises a 17-bit register, with the feedback function comprising an exclusive-OR of the 14th and 17th bits. The numbers 17 and 131071 are both prime.

It is desirable that the register should be shifted, between channel selections, a number of places greater than its own length. This ensures that the "randomising" process has been applied to every bit in the register. Any desired subset of the register bits may be used to effect the channel selection.

We claim:

1. In a system for multiple device identification and communication of data having an interrogating station for interrogating a plurality of transponders wherein the interrogating station is capable of receiving communications from said transponders via carrier frequencies, each said transponder comprising:
   transmitter means adapted, when the transponder is interrogated by the interrogating station, to transmit an information signal via a carrier signal having a frequency selected from a set of possible carrier signal frequencies; and
   frequency generating means for selectively generating the set of possible carrier signal frequencies;
   the information signal being transmitted successively or repetitively using at each transmission a newly selected carrier signal frequency or set of newly selected carrier signal frequencies;
   wherein the frequency of the newly selected carrier signal frequency or set of newly selected carrier signal frequencies is selected independent of external influence and independent of external knowledge by the interrogating station.

2. A transponder as claimed in claim 1, wherein selection of the carrier signal frequency from the set of possible carrier signal frequencies is random.

3. A system as claimed in claim 1, wherein only one carrier signal is selected at each transmission.

4. A system as claimed in claim 1, wherein the transmitter means is adapted to go to an idle state or transmit on a redundant channel in order to provide a break in transmission for a predetermined period of time.

5. A system as claimed in claim 1, wherein each carrier signal generated is assigned a probability weighting in accordance with a desired use of each carrier signal at each transmission.

6. A system as claimed in claim 1, wherein frequency of the set of possible carrier signals is programmed in the transponder from an external source.

7. A system as claimed in claim 1, further comprising a tuned pickup coil adapted to extract power, tuning signal and/or information signals from an externally applied magnetic field.

8. A system as claimed in claim 1, wherein the information signal is a unique signal identifiable with the transponder.

9. An identification system as claimed in claim 1, and including system receiver means for receiving each information signal simultaneously.

10. An identification system as claimed in claim 9, wherein the receiver means further includes logic means for ignoring information signals having the same newly selected frequency.

11. The system of claim 1 wherein the interrogating station is capable of identifying and receiving communications from two or more of said transponders simultaneously.

12. The system of claim 7 wherein the interrogating station is capable of identifying and receiving communications from two or more of said transponders simultaneously.

13. In a system for multiple device identification and communication of data having an interrogating station for interrogating a plurality of transponders wherein the interrogating station is capable of receiving communications from said transponders via carrier frequencies, each said transponder comprising:
   logic means adapted to provide an information signal for transmission by said transponder;
   transmitter means adapted to transmit the informational signal;
   frequency generating means adapted to provide a set of possible carrier signal frequencies greater than two in number, at least one of the carrier signal frequencies being available for transmission of the information signal at each transmission of the information signal; and
   carrier signal selection means adapted to select at least on of the carrier signal frequencies from the set of possible carrier signal frequencies at each transmission of the information signal, the frequency selected for each transmission of the information signal being determined internal of the transponder independent of external knowledge and external influence by the interrogating station.

14. A system as claimed in claim 13, wherein upon receipt of an external selection signal, the carrier signal selection means selects or reselects at least one of the carrier signals for transmission.

15. A system as claimed in claim 13, wherein selection of the carrier signal frequency from the set of possible carrier signal frequencies is random.

16. A system as claimed in claim 13, wherein only one carrier signal is selected at each transmission.

17. A system as claimed in claim 13, wherein the transmitter means is adapted to go to an idle state or transmit on a redundant channel in order to provide a break in transmission for a predetermined period of time.

18. A system as claimed in claim 13, wherein each carrier signal generated is assigned a probability weighting in accordance with a desired use of each carrier signal at each transmission.

19. A system as claimed in claim 13, wherein frequency of the set of possible carrier signals is programmed in the transponder from an external source.

20. A system as claimed in claim 13, further comprising a tuned pickup coil adapted to extract power, tuning signal and/or information signals from an externally applied magnetic field.

21. A system as claimed in claim 13, wherein the information signal is a unique signal identifiable with the transponder.

22. An identification system as claimed in claim 13, and including system receiver means for receiving each information signal simultaneously.

23. The system of claim 13 wherein the interrogating station is capable of identifying and receiving communications from two or more of said transponders simultaneously.

24. A system of device identification comprising;
at least two identifiable devices and a device identifier adapted to communicate with said devices by interrogating the devices and receiving data signals from said devices, said identifier adapted to receive signals simultaneously from a plurality of said devices, wherein,
each identifiable device includes transmitter means adapted to transmit a data signal to the identifier,
each transmitter means being adapted to transmit said data signal via a respective carrier signal, the frequency of the carrier signal being selected by each respective device from a predetermined set of carrier signal frequencies greater than two in number, the frequency of each carrier signal being determined internal of each respective device independent of external knowledge and external influence by the identifier.

25. A system as claimed in claim 24, wherein each device is embodied in a VLSI chip.

26. A system as claimed in claim 24, further comprising comparison means adapted to disregard corrupted signals received simultaneously from each device.

27. A system as claimed in claim 24, wherein each device is a passive device.

28. A system as claimed in claim 24, including means for phase coherently generating the newly selected carrier signal using an external powering field as a frequency reference.

29. A system as claimed in claim 24, including means for generating the newly selected carrier signal frequency using at least one phase-locked loop frequency multiplier, and subsequently dividing the carrier signal frequency to obtain a desired frequency of the carrier signal.

30. A system as claimed in claim 29, including means for ignoring frequencies which correspond to harmonics of the powering field.

31. A system as claimed in claim 24, wherein each transmitter means transmits the data signal asynchronously.

32. The system of claim 24 wherein said device identifier is adapted to identify and communicate simultaneously with two or more of said identifiable devices by simultaneously receiving data signals from said two or more identifiable devices.

33. A method of communication between an interrogator and at least one remote device, said method comprising the steps of:
the interrogator interrogating one or more of said remote devices,
each remote device generating a first signal for transmission via a carrier signal at a frequency selected by each respective remote device from a respective predetermined set of carrier signal frequencies, the frequency of the carrier signal being determined by each remote device,
transmitting said first signal from each remote device to the interrogator, and
generating and transmitting the first signal successively or repetitively at each transmission via a new carrier signal, the frequency of the new carrier signal being newly selected internal of each remote device and independent of external knowledge and influence by the interrogator.

34. A method as claimed in claim 33, wherein each remote device transmits the first signal to the interrogator simultaneously.

35. A method as claimed in claim 33, wherein the first signal includes a code unique to each remote device.

36. The method of claim 33 wherein the interrogator identifies and communicates simultaneously with two or more of said remote devices by receiving respective signals simultaneously from said two or more devices.

37. In a system for communication between an interrogating station for interrogating a plurality of transponders wherein the interrogating station includes a receiver that is capable of receiving communication from the transponders via carrier frequencies, wherein each said transponder is adapted for asynchronous communication with the external receiver, said transponder including:
transmitter means adapted to transmit asynchronously at least one signal from the transponder to the external receiver,
frequency generating means adapted to provide a predetermined set of possible carrier frequencies,
the transmitter means being adapted to transmit the at least one signal at a frequency selected from the predetermined set of possible carrier frequencies independent of external knowledge and external influence by said interrogating station.

38. The system of claim 37 wherein the interrogating station is capable of identifying and receiving communications from two or more of said transponders simultaneously.

39. A system as claimed in claim 1, wherein transmission by each transponder is asynchronous.

* * * * *